SAMUEL I. THOMPSON.
Improvement in Nut-Locks.

No. 114,991.          Patented May 16, 1871.

United States Patent Office.

SAMUEL I. THOMPSON, OF NEW WATERFORD, OHIO.

Letters Patent No. 114,991, dated May 16, 1871.

IMPROVEMENT IN NUT-LOCKS.

The Schedule referred to in these Letters Patent and making part of the same.

*To all whom it may concern:*

Be it known that I, SAMUEL I. THOMPSON, of New Waterford, in the county of Columbiana and in the State of Ohio, have invented certain new and useful Improvements in Nut-Locks; and do hereby declare that the following is a full, clear, and exact description thereof, reference being had to the accompanying drawing making a part of this specification, in which—

Letters of like name and kind refer to like parts in each of the figures.

My invention belongs to a class of inventions used for securing two or more nuts in any desired radial position with reference to each other or to the bolts; and It consists in the employment of a link for passing over or around the nuts so as to prevent them from turning, and, in combination therewith, of a forked spring secured beneath one of said nuts, and extending outward over said link for the purpose of confining the same in position, substantially as is hereinafter specified.

In the annexed drawing—

A and A' represent two rails, connected together by means of two metal plates, B and B', placed within or upon the concave sides of the rails, and secured thereon and together by four bolts, C, passing through said rails and plates, and each provided upon one of its ends with a head, c, and upon the opposite end with the nut D, all in the usual manner.

The nuts, being screwed firmly to place and arranged in a line with each other, are locked in position by means of a link, E, having an interior width corresponding to the diameter of said nuts, and a length somewhat greater than the distance between the outer sides of the outer nuts, so as to have a bearing upon their upper and lower sides.

Figure 1:
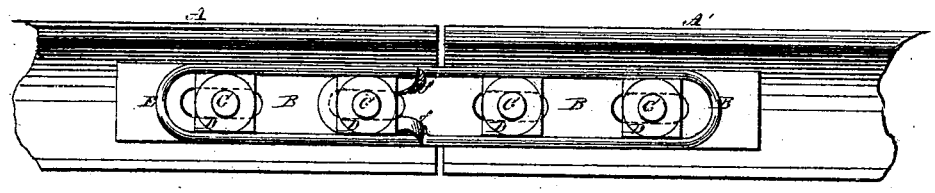
Figure 1 is a side elevation of a railroad "fish-joint," with the nuts secured in radial position by means of my device.
Figure 2:
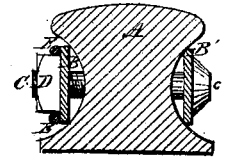
Figure 2 is a vertical cross-section of the same on the line $x\ x$ of fig. 1.
Figure 3:
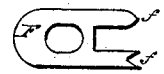
Figure 3 is a plan view of the spring holder used for securing the link in position.

In order that the link E may not be jarred or otherwise accidentally removed from position a strip or holder of sheet metal, (preferably steel,) F, having the form shown in fig. 3, is placed beneath one of the center nuts, and its forked ends $f$ turned upward and outward so as to embrace the outside of said link and hold it against the fish-plate B.

When it is desired to remove the nuts the ends $f$ of the holder may be readily sprung inward so as to allow the link to pass outward; after which, by pressing them together in a similar manner, the link may be replaced.

The advantages possessed by this device are simplicity of construction and cheapness, combined with efficiency and durability.

Having thus fully set forth the nature and merits of my invention,

What I claim as new is—

The link E and the forked holder F and $f$, constructed as described, and combined with the nuts E and bolts C, substantially as shown and for the purpose specified.

In testimony that I claim the foregoing I have hereunto set my hand this 26th day of January, 1871.

SAMUEL I. THOMPSON.

Witnesses:
JOSEPH KANNAL,
M. LYON.